US012596590B2

(12) United States Patent
Simons et al.

(10) Patent No.: US 12,596,590 B2
(45) Date of Patent: Apr. 7, 2026

(54) SYSTEMS AND METHODS FOR CLOUD RESOURCE MANAGER

(71) Applicant: Palantir Technologies Inc., Denver, CO (US)

(72) Inventors: Kevin Simons, San Francisco, CA (US); Adam DeHovitz, Denver, CO (US); Aravind Baratha Raj, Denver, CO (US); Tony Au-Yeung, Denver, CO (US)

(73) Assignee: Palantir Technologies Inc., Aventura, FL (US)

( * ) Notice: Subject to any disclaimer, the term of this patent is extended or adjusted under 35 U.S.C. 154(b) by 92 days.

(21) Appl. No.: 18/769,835

(22) Filed: Jul. 11, 2024

(65) Prior Publication Data

US 2025/0021399 A1    Jan. 16, 2025

Related U.S. Application Data

(60) Provisional application No. 63/526,548, filed on Jul. 13, 2023.

(51) Int. Cl.
*G06F 9/50*      (2006.01)
*H04L 9/08*      (2006.01)

(52) U.S. Cl.
CPC .......... *G06F 9/5072* (2013.01); *H04L 9/0819* (2013.01)

(58) Field of Classification Search
CPC ............................ G06F 9/5072; H04L 9/0819
See application file for complete search history.

(56) References Cited

U.S. PATENT DOCUMENTS

2021/0133344 A1*   5/2021   Cox, Jr. ................ H04L 9/0894
2021/0306418 A1*   9/2021   Lamba .................... H04L 63/10

* cited by examiner

*Primary Examiner* — Suraj M Joshi
(74) *Attorney, Agent, or Firm* — Faegre Drinker Biddle & Reath LLP

(57)          ABSTRACT

In some examples, systems and methods for managing cloud resources (e.g., distributed resources) are provided. For example, a method includes: receiving a request to create a data bucket from a client application, the request including a bucket template; generating a cryptographic key for the data bucket; generating the data bucket in a cloud platform based at least in part on the bucket template; associating the cryptographic key to the generated data bucket; generating metadata associated with the generated data bucket; and providing the metadata associated with the generated data bucket to the client application.

20 Claims, 5 Drawing Sheets

FIG. 3

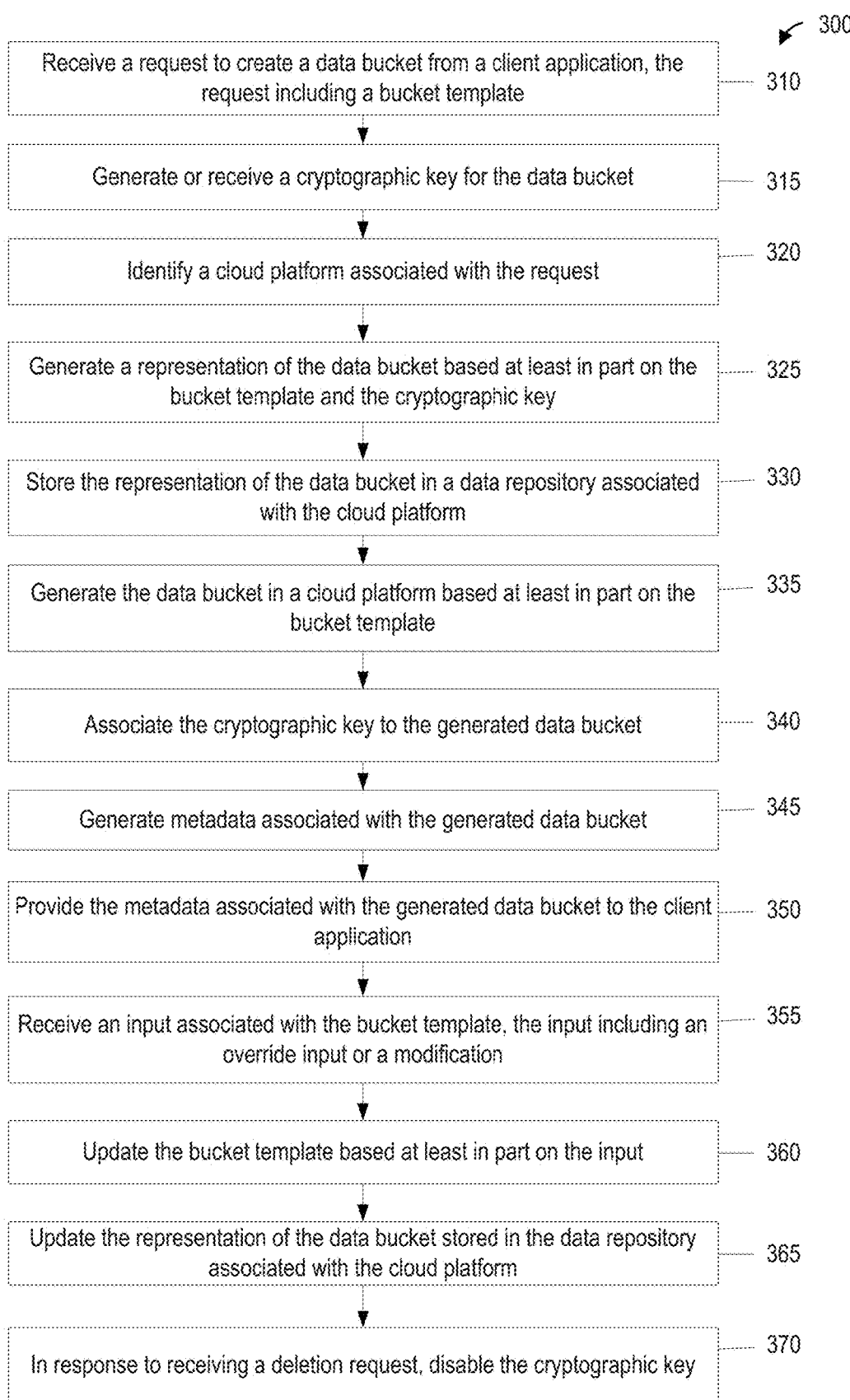

300

Receive a request to create a data bucket from a client application, the request including a bucket template — 310

Generate or receive a cryptographic key for the data bucket — 315

Identify a cloud platform associated with the request — 320

Generate a representation of the data bucket based at least in part on the bucket template and the cryptographic key — 325

Store the representation of the data bucket in a data repository associated with the cloud platform — 330

Generate the data bucket in a cloud platform based at least in part on the bucket template — 335

Associate the cryptographic key to the generated data bucket — 340

Generate metadata associated with the generated data bucket — 345

Provide the metadata associated with the generated data bucket to the client application — 350

Receive an input associated with the bucket template, the input including an override input or a modification — 355

Update the bucket template based at least in part on the input — 360

Update the representation of the data bucket stored in the data repository associated with the cloud platform — 365

In response to receiving a deletion request, disable the cryptographic key — 370

400

| Data Field | Description |
|---|---|
| Object Lifecycle | Configures the lifecycle manager of the bucket |
| Tags | Tags to be applied to the bucket |
| Other Configurations | Other configuration parameters |

FIG. 4

SYSTEMS AND METHODS FOR CLOUD RESOURCE MANAGER

This application claims priority U.S. Provisional Application No. 63/526,548, filed Jul. 13, 2023, which is incorporated in its entirety by reference herein for all purposes.

BACKGROUND

System administrators often manually set up cloud resources. For example, system administrators manually trigger bucket creations. In some examples, cloud resources are generated for a client with respect to each cloud platform. In certain examples, changing cloud resources often requires configuration changes.

Hence, it is desirable to improve techniques for managing cloud resources.

SUMMARY

Certain embodiments of the present disclosure relate to managing cloud resources. More particularly, some embodiments of the present disclosure relate to cloud-agnostic resource management.

At least some embodiments are directed to a method for cloud resource management. In certain embodiments, the method comprises: receiving a request to create a data bucket from a client application, the request including a bucket template; generating a cryptographic key for the data bucket; generating the data bucket in a cloud platform based at least in part on the bucket template; associating the cryptographic key to the generated data bucket; generating metadata associated with the generated data bucket; and providing the metadata associated with the generated data bucket to the client application; wherein the method is performed using one or more processors.

At least certain embodiments are directed to a system for cloud resource management. In some embodiments, the system comprises: one or more memories comprising instructions stored thereon; and one or more processors configured to execute the instructions and perform operations comprising: receiving a request to create a data bucket from a client application, the request including a bucket template; generating a cryptographic key for the data bucket; generating the data bucket in a cloud platform based at least in part on the bucket template; associating the cryptographic key to the generated data bucket; generating metadata associated with the generated data bucket; and providing the metadata associated with the generated data bucket to the client application.

At least some embodiments are directed to a non-transitory computer-readable storage medium having instructions for cloud resource management that, when executed by one or more processors, cause the one or more processors to perform operations comprising: receiving a request to create a data bucket from a client application, the request including a bucket template; generating a cryptographic key for the data bucket; generating the data bucket in a cloud platform based at least in part on the bucket template; associating the cryptographic key to the generated data bucket; generating metadata associated with the generated data bucket; and providing the metadata associated with the generated data bucket to the client application.

In some embodiments, a cloud resource manager can be used to manage access control, for example, who is allowed to access a data bucket and from where. As an example, the cloud resource manager only allows requests that come from user with certain credential (e.g., a user within a certain organization) to access certain data bucket.

Depending upon embodiment, one or more benefits may be achieved. These benefits and various additional objects, features and advantages of the present disclosure can be fully appreciated with reference to the detailed description and accompanying drawings that follow.

BRIEF DESCRIPTION OF THE DRAWINGS

FIG. 3 illustrate a simplified diagram showing a method 300 for cloud resource management according to certain embodiments of the present disclosure.

FIG. 4 shows an example of a bucket template, according to certain embodiments of the present disclosure.

DETAILED DESCRIPTION

Figure 1:
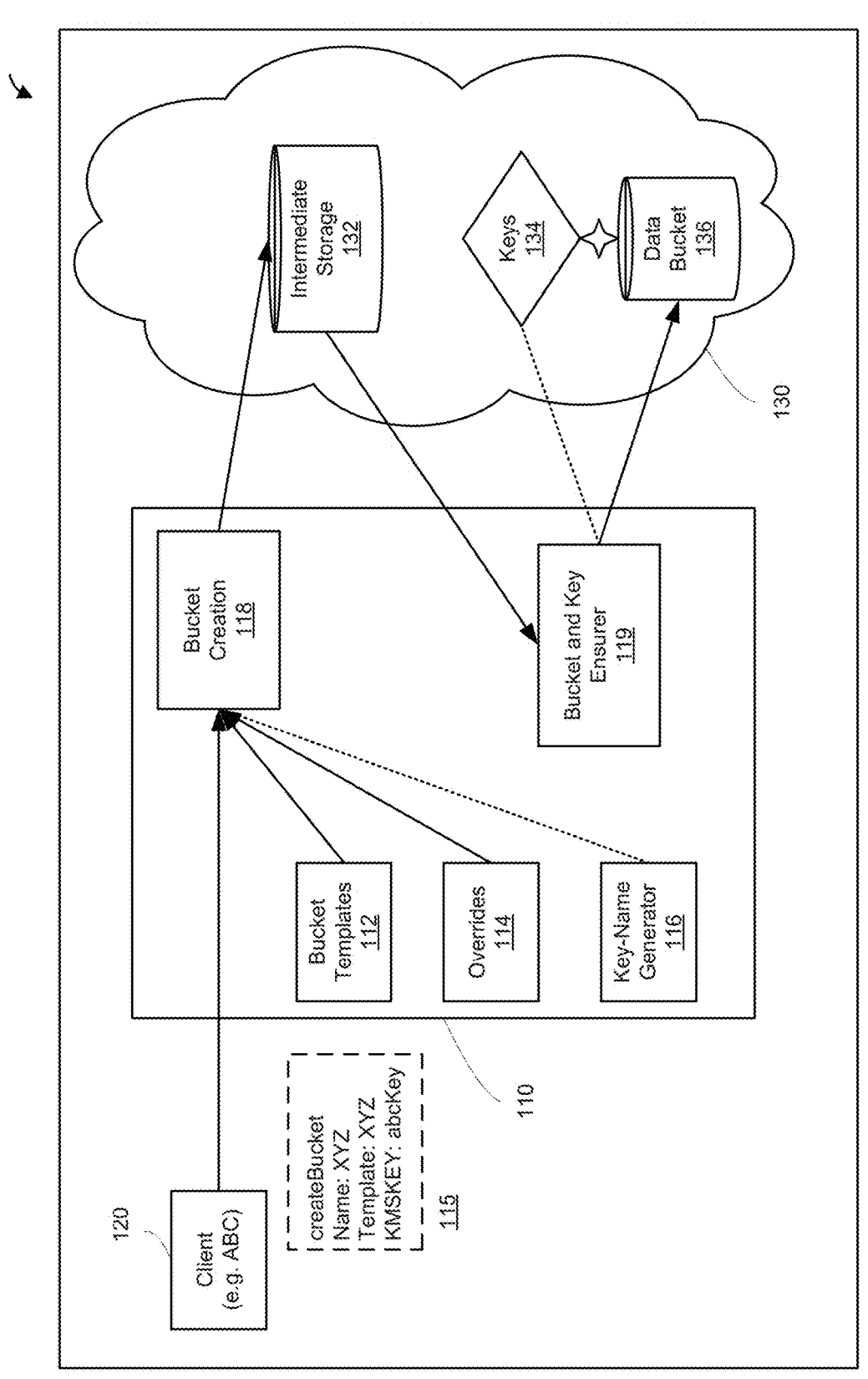
FIG. 1 is an illustrative diagram for a cloud resource management environment or workflow, according to certain embodiments of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in a same software. In certain embodiments, the term "access" or "accessing" means retrieving data or information, and/or generating data or information.

Conventional systems and methods manually set up cloud resources by system administrators. According to some embodiments, cloud resources are generated for a client with respect to each cloud platform. In certain embodiments, these processes require configuration changes when a client application requires the use of a cloud platform different from the existing cloud platform in use.

Various embodiments of the present disclosure can achieve benefits and/or improvements by computing systems and/or software, for example, to automate the process of creating, managing, modifying, and/or deleting cloud resources. In some embodiments, benefits include significant improvements, including, for example, increased efficiency, reduced complexity, and improved standardization, in creating and managing cloud resources (e.g., data buckets). In certain embodiments, benefits include improved efficiency for cloud resource management across multiple cloud platforms.

At least some embodiments of the present disclosure are directed to systems and methods for cloud resource management (e.g., creation, modification, access controls, etc.), for example, allowing opinionated cloud resource management and cloud-agnostic resource management. In certain embodiments, opinionated cloud resource management refers to providing setting up the cloud resource management including one or more resource parameters, for example, such as one or more configuration parameters, one or more lifecycle parameters, one or more expiration parameters, one or more access parameters, one or more encryption parameters, and/or the like.

According to certain embodiments, several workflows are needed for software applications to create cloud resources dynamically. In some embodiments, these cloud resources can be of various types, for example, data buckets (e.g., AWS (Amazon™ Web Service) S3 (Simple Storage Service) buckets, GCP (Google™ Cloud Provider) buckets, Azure™ storage buckets, rook-ceph storage, web service buckets, etc.) to store data and/or provide access to data. In some examples of conventional systems, these data buckets were provisioned statically, for example, which relies on a human creating them. In certain embodiments, there are multiple use cases in which software applications will need to create buckets dynamically without human intervention, also referred to as self-service workflows. In some embodiments, a data bucket refers to a data storage unit and/or a basic container for storing data in the cloud. In certain embodiments, a data bucket is a type of cloud resource.

According to some embodiments, in order to satisfy one or more self-service workflows, systems and methods include one or more features designed to: 1) build a new service that could dynamically create underlying cloud resources through API calls. In some examples, the applications will run on a software platform such that it does not need to specify which cloud infrastructure (e.g., cloud centers of various vendors, cloud platform, etc.) to run on; and 2) the software systems and methods are provided by a software service that is configured to receive requests (e.g., RESTful requests) from software applications via a respective API (application programming interface) to create cloud resources. In certain embodiments, the software service is configured to handle all of the authorization and authentication needed and then dynamically reach out to the cloud infrastructure that it was running on to create underlying cloud resources. In some embodiments, the software service is configured to return the metadata of the cloud resource that it created to the software application (e.g., the original caller, the client application), so the cloud resource could be used after creation time. In certain embodiments, the systems and methods for the cloud resource management are provided by a software service.

According to certain embodiments, the systems and methods implemented by a software service provide a level of abstraction (e.g., via API(s)) in between one or more application layers services (e.g., software applications, software applications run on software services) and cloud resources to be created. In some embodiments, there are multiple advantages for providing a level of abstraction and API in between application layers services and the cloud resources to be created, including one or more of: 1) dynamic cloud resources can be created without human intervention and/or no matter on which cloud to run, also referred to as cloud-agnostic; 2) a single software service, for example, the cloud resource management software service, needs to have the authorization, authentication, and permissions to create cloud resources for various clients that need dynamic cloud resources; 3) clients that need dynamic cloud resources can authenticate with the cloud resource management software service in the same manner no matter on which cloud to run; and/or 4) the one or more created cloud resources can be kept standardized regardless of how these are created.

FIG. 1 is an illustrative diagram for a cloud resource management environment or workflow 100, according to certain embodiments of the present disclosure. FIG. 1 is merely an example. One of the ordinary skilled in the art would recognize many variations, alternatives, and modifications. In some embodiments, the cloud resource management environment 100 includes a cloud resource management software service 110 (e.g., a cloud resource management system, a cloud resource management manager, etc.), one or more client applications 120 (e.g., a client, a software application, etc.), and one or more cloud platforms 130 (e.g., a cloud center of a vendor, a cloud infrastructure, etc.). For example, some of the components may be expanded, integrated, and/or combined. Other components may be inserted into those noted above. Depending upon the embodiment, the arrangement of components may be interchanged with others replaced. Further details of these components are found throughout the present disclosure.

According to certain embodiments, the cloud resource management software service 110 is an opinionated, cloud-agnostic software service for provisioning buckets in the cloud provider. In some embodiments, the cloud resource management workflow 100 can work consistently in heterogeneous cloud environments. For example, AWS, Azure and GCP are supported. In certain embodiments, the cloud resource management workflow 100 is client driven. In some embodiments, data buckets are only created when clients request them via the API. In certain embodiments, clients can request as many buckets as needed, which can be especially useful for supporting multitenancy.

According to some embodiments, the one or more client applications 120 may determine whether a bucket, identified by the bucket ID (identifier) is managed by the cloud resource management software service 110. In certain embodiments, the one or more client applications 120 may use an API endpoint (e.g., getBucket endpoint) to determine whether the bucket, identified by the bucket ID (identifier) is managed by the cloud resource management software service 110. In some embodiments, an API endpoint is a connection point at which an API connects with a software program (e.g., a software application, a software service, etc.) and/or receives requests. In certain examples, an API endpoint can include a URL (uniform resource locator) of a server or a software service. In some examples, an API endpoint can include an API request made by a client application via the API.

In some embodiments, the one or more client applications 120 retrieve the bucket name. In certain embodiments, if the bucket does not exist or is not managed by the cloud resource management software service 110, the one or more client applications 120 send a request to provision (e.g., create) a new data bucket. In some embodiments, the one or more client applications 120 send a request using an API. In certain embodiments, the one or more client applications 120 send a request by using an API endpoint (e.g., createBucket endpoint 115). In some embodiments, if the cloud resource (e.g., bucket) is not managed by the cloud resource management software service 110, the system is configured to use an endpoint (e.g., the createBucket endpoint 115) to provision a new bucket and use the bucket name provided by the cloud resource manager 110.

According to certain embodiments, the one or more client applications 120 send requests to the cloud resource management software service 110 referring to the bucket ID and/or the bucket name. In some embodiments, the bucket name is the name of the bucket in the one or more cloud platforms 130. In certain embodiments, the bucket ID is used for the cloud resource manager (CRM) 110 for bucket management actions including creation and/or deletion.

In some embodiments, bucket ID and buck name distinction exists because each cloud platform (e.g., cloud provider) may have distinct requirements for bucket names including, for example, character limits, length restrictions, and enforcement of uniqueness across variable scopes, and/or the like. In certain embodiments, rather than each client application 120 understanding these rules and create appropriate bucket names, the cloud resource management software service 110 handles these rules. In some embodiments, the one or more clients 120 may use the bucket name and/or the bucket ID. In certain examples, the bucket names are provided by the cloud resource manager 110.

According to certain embodiments, if the bucket exists outside of the management of the cloud resource management software service 110, the client application 120 may create a second, empty bucket. In some embodiments, the cloud resource management software service 110 creates, modifies, and/or deletes bucket templates 112. In certain embodiments, the cloud resource management software service 110 can add a new bucket template. FIG. 4 shows an example of a bucket template, according to certain embodiments of the present disclosure. FIG. 4 is merely an example. One of ordinary skill in the art would recognize many variations, alternatives, and modifications. In this example, the object-lifecycle field in the template configures the lifecycle management of the bucket. In some examples, the object-lifecycle field includes one or more subfields. In certain examples, the object-lifecycle field includes one or more of the following subfields:

enable-versioning: This subfield configures whether object versioning is enabled or not.

days-before-deletion-for-non-current-object: This subfield configures the number of days before a non-current version of an object is deleted.

days-before-deletion-for-current-object: This subfield configures the number of days before a current version of an object is expired.

In some examples, if object versioning is disabled, the object will irrecoverably get deleted after the configured number of days. In certain examples, if object versioning is enabled, the expiration of current objects simply makes the current version non-current. In some examples, permanent deletion will occur after days-before-deletion-for-non-current-object days after expiration. In certain embodiments, the bucket template includes one or more tags, for example, a tag for identifying the bucket, a tag for access permission, and/or the like. In some embodiments, the bucket template includes one or more other data fields. In certain embodiments, the bucket template includes one or more configuration parameters.

According to certain embodiments, a client application 120 sends a request (e.g., an API request) to the cloud resource management software service 110 to create a cloud resource, for example, a data bucket. In certain embodiments, the request includes a bucket name, a bucket template, and optionally provide a cryptographic key (e.g., a KMS (key management service, an encryption key, etc.) to encrypt objects.

According to some embodiments, the cloud resource management software service 110 allows an override 114 to certain configuration of the data bucket. In certain embodiments, the override also refers to as an administrator override. In some embodiments, the override only applies to one or more specific client applications. In certain embodiments, the override does not apply to at least one of the one or more client applications 120.

According to certain embodiments, the cloud resource management software service 110 includes key-name generator 116 (e.g., a key-name generating software service) to generate a cryptographic key if it is not provided, for example, by the client application 120. In some embodiments, the cloud resource management software service 110 performs a bucket creation operation 118 (e.g., a bucket creation software service), for example, combines the bucket template, one or more overrides, and/or a cryptographic key to create a representation (e.g., an intermediate representation, storedBucket data type) of a data bucket. In certain embodiments, the representation (e.g., the intermediate representation) of the data bucket is persisted in intermediate storage 132 in the cloud platform 130.

According to some embodiments, the cloud resource management software service 110 includes a bucket and key ensuring operation 119 (e.g., a bucket and key ensurer, a bucket and key ensuring job, a bucket and key ensuring software service, etc.) that periodically scans one or more representations (e.g., the storedBucket types). In certain embodiments, the cloud resource management software service 110 and/or the bucket and key ensuring service 119 ensures that the configured key 134 exists and/or that the data bucket 136 exists as configured. In some embodiments, if the data bucket is deleted and/or misconfigured by a third party, the cloud resource management software service 110 may recreate and/or reconfigure the data bucket 136, for example, via the bucket creation operation 118.

According to certain embodiments, if a bucket template is modified in a new release, and/or an override is configured, the representation of the data bucket (e.g., the storedBucket types) are updated. In some embodiments, if the override is from a specific client application, the corresponding representation of the data bucket at one or more corresponding cloud platforms is updated. In certain embodiments, when the bucket and key ensuring operation 119 runs again, it will update the managed data buckets 136 to reflect their new configurations. For example, a specific client application 120 and/or the cloud resource management software service 110 may want to configure the rescue bucket template to store old versions for 21 days rather than the default 7 days to prevent data loss.

In some embodiments, the client application 120 provides a first bucket name (e.g., the desired bucket name). In certain embodiments, the bucket name in the generated bucket may use a second bucket name different from the first bucket name. In some embodiments, the client application 120 uses the second bucket name returned by the cloud resource management software service 110.

According to certain embodiments, the client application 120 can also send a request to the cloud resource management software service 110 to schedule the deletion of a data bucket and/or its associated key. In some embodiments, the client application 120 can also send a request to the cloud resource management software service 110 to schedule the deletion of a data bucket and/or its associated key (e.g., the cryptographic key) if it's generated by the cloud resource management software service 110.

In certain embodiments, the cloud resource management software service 110 disables the generated key, which will prevent data from being read from or written to the data bucket. In some embodiments, this provides a deletion grace period to cancel the deletion via another request to the cloud resource management software service 110. In certain embodiments, the deletion grace period can be set by the client application 120 and/or by a configuration request. In some embodiments, if the deletion is not cancelled within the grace period (e.g., default 7 days), the cloud resource management software service 110 is configured to schedule the key for deletion, empty the data bucket of all its objects (if required by cloud provider), and/or delete the data bucket.

According to some embodiments, the cloud resource management software service 110 is configured to create, manage, modify, and/or delete data buckets across one or more cloud platforms. In certain embodiments, the cloud resource management software service 110 is configured to create, manage, modify, and/or delete data buckets across two or more cloud platforms including a first cloud platform and a second cloud platform different from the first cloud platform. In some examples, the first cloud platform (e.g., AWS) and the second cloud platform (e.g., Azure) use different rules and/or features, such as different encryption rules, different data bucket naming rules, and/or other differences.

In some embodiments, the cloud resource management software service 110 uses a single interface (e.g., a single set of APIs, etc.) coupled to one or more client applications 120. In certain embodiments, the cloud resource management software service 110 includes an interface allowing users to customize and/or override the configuration of one or more data buckets, like providing an opinionated setting. In some embodiments, the cloud resource management software service 110 can modify data bucket templates across one or more cloud platforms. In certain embodiments, the cloud resource management software service 110 can provide a consistent experience no matter where the software is supported.

In some embodiments, the cloud resource management environment or workflow 100 includes a repository (e.g., the intermediate storage 132, the data bucket 136, etc.) including and/or storing data buckets, data bucket representations, data bucket metadata, one or more other cloud resources, configurations, keys, and/or the like. The repository may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the cloud resource management environment or workflow 100 can execute software or firmware stored in non-transitory computer-readable medium to implement various processing steps. Various components and processors of the cloud resource management environment or workflow 100 can be implemented by one or more computing devices including, but not limited to, circuits, a computer, a cloud-based processing unit, a processor, a processing unit, a microprocessor, a mobile computing device, and/or a tablet computer. In some cases, various components of the cloud resource management environment or workflow 100 (e.g., the cloud resource management software service 110, the one or more client applications 120, the one or more cloud platforms 130, etc.) can be implemented on a shared computing device. Alternatively, a component of the cloud resource management environment or workflow 100 can be implemented on multiple computing devices. In some implementations, various modules and components of the cloud resource management environment or workflow 100 can be implemented as software, hardware, firmware, or a combination thereof. In some cases, various components of the cloud resource management environment or workflow 100 can be implemented in software or firmware executed by a computing device.

Various components of the cloud resource management environment or workflow 100 can communicate via or be coupled to via a communication interface, for example, a wired or wireless interface. The communication interface includes, but is not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 2:
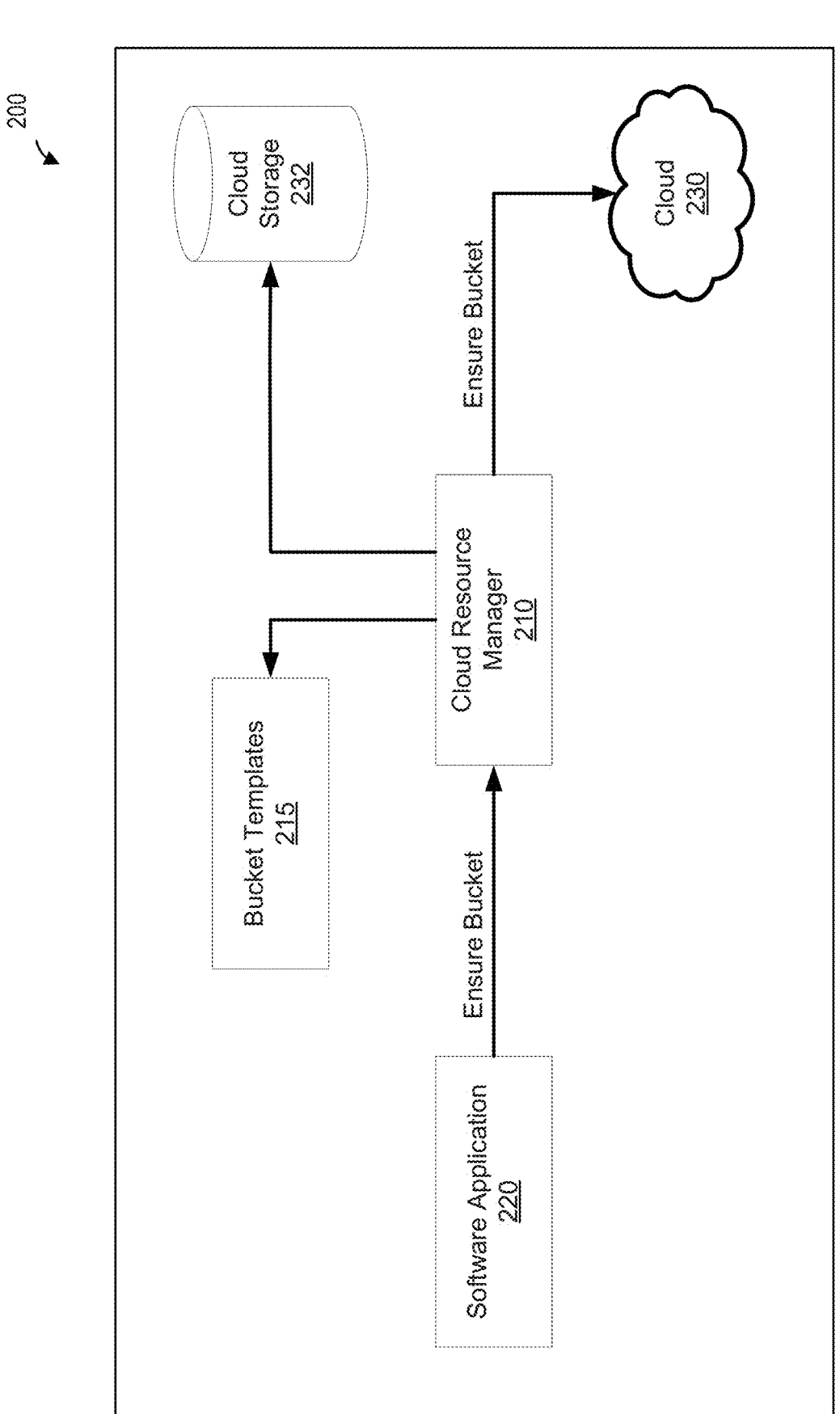
FIG. 2 is an illustrative diagram for a cloud resource management architecture, according to certain embodiments of the present disclosure.

FIG. 2 is an illustrative diagram for a cloud resource management architecture 200, according to certain embodiments of the present disclosure. FIG. 2 is merely an example. One of the ordinary skilled in the art would recognize many variations, alternatives, and modifications. In some embodiments, the cloud resource management environment 200 includes a cloud resource management software service 210 (e.g., a cloud resource management system, a cloud resource management manager, etc.), one or more software applications 220 (e.g., one or more client applications, one or more software services, etc.), one or more bucket templates 215, one or more cloud platforms 230 (e.g., a cloud center of a vendor, a cloud infrastructure, etc.), and one or more cloud storages 232. For example, some of the components may be expanded, integrated, and/or combined. Other components may be inserted into those noted above. Depending upon the embodiment, the arrangement of components may be interchanged with others replaced. Further details of these components are found throughout the present disclosure.

According to some embodiments, the one or more software applications 220 make a request to the cloud resource management software service 210 to check existence, create, modify, and/or delete a data bucket. In certain embodiments, the request includes a bucket name, a bucket template, and/or a cryptographic key. In certain embodiments, the cloud resource management software service 210 receives the request, merges the request with a corresponding bucket template 215, and/or any overrides (e.g., one or more administrator configurations), to generate a representation of the data bucket. In some embodiments, the cloud resource management software service 210 stores the representation of the data buck into the cloud storage 232. In certain embodiments, the representation of the data bucket can be used to deconflict multiple requests, apply one or more overrides (e.g., administrator configurations), and/or chain together multiple requests (e.g., data bucket requests, cloud resource requests). In some embodiments, the generated data buckets are used in the one or more cloud platforms 230.

According to certain embodiments, the representation of the data bucket includes one or more bucket configurations of the data bucket. In some embodiments, changes to one or more bucket templates 215 are reflected in the cloud storage 232. In certain embodiments, overrides are reflected in the cloud storage 232. In some embodiments, the cloud resource management software service 210 creates the data bucket based on the representation stored in the cloud storage 232. In certain embodiments, once the data bucket is created, the cloud resource management software service 210 returns a response including metadata associated with the data bucket to the software application 220. In some embodiments, the cloud resource management software service 210 adds certain components and/or properties to the data buckets based on the corresponding cloud platform. For example, if versioning is turned on and it is using the AWS, the cloud resource management software service 210 adds Expire-dObjectDeleteMarket.

According to some embodiments, one or more configurations (e.g., object retention days) may be overridden. In certain embodiments, the cloud resource management software service 210 includes an authorization operation to check whether the authorization of requests is satisfied. In some embodiments, the cloud resource management software service 210 creates one or more cloud resources at one or more cloud platforms when requested. In certain embodiments, the cloud resources can be standardized across multiple cloud platforms.

FIG. 3 illustrate a simplified diagram showing a method 300 for cloud resource management according to certain embodiments of the present disclosure. This diagram is merely an example. One of ordinary skill in the art would recognize many variations, alternatives, and modifications. The method 300 for cloud resource management includes processes 310, 315, 320, 325, 330, 335, 340, 345, 350, 355, 360, 365, and 370. Although the above has been shown using a selected group of processes for the method 300 for cloud resource management, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

In some embodiments, some or all processes (e.g., steps) of the method 300 are performed by a system (e.g., the computing system 600). In certain examples, some or all processes (e.g., steps) of the method 300 are performed by a computer and/or a processor directed by a code. For example, a computer includes a server computer and/or a client computer (e.g., a personal computer). In some examples, some or all processes (e.g., steps) of the method 300 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, at process 310, the system (e.g., the cloud resource management software service 110) receives a request to create a data bucket from a client application (e.g., the client application 120). In certain embodiments, the request includes a bucket name, a bucket template, and/or a cryptographic key. In some embodiments, the request includes a bucket template. In certain embodiments, the system receives a request to check whether the data bucket exists before creation. In some embodiments, at process 315, the system generates or receives a cryptographic key for the data bucket. In certain embodiments, the cryptographic key is used for the encryption of the data bucket.

According to certain embodiments, at process 320, the system identifies a cloud platform associated with the request and/or the client application. In some embodiments, at process 325, the system generates a representation of the data bucket based at least in part on the bucket template and the cryptographic key. In certain embodiments, at process 325, the system stores the representation of the data bucket in a data repository associated with the cloud platform. In some embodiments, the system generates a first representation of the data bucket for a first cloud platform and a second representation of the data bucket for a second cloud platform different from the first cloud platform. In certain embodiments, the system stores the first representation of the data bucket in a data repository associated with the first cloud platform and the second representation of the data bucket in a data repository associated with the second cloud platform.

According to some embodiments, at process 335, the system generates the data bucket in a cloud platform based at least in part on the bucket template. In certain embodiments, the request includes a first name of the data bucket; where the system designates a second name of the data bucket, where the first name of the data bucket is different from the second name of the data bucket. In some embodiments, the second name is compliant with the respective cloud platform requirements. In certain embodiments, the system is configured to generate a first data bucket for a first cloud platform based at least in part on the bucket template and a second data bucket in a second cloud platform based at least in part on the bucket template, where the second cloud platform is different from the first cloud platform. In certain embodiments, at process 340, the system associates the cryptographic key to the generated data bucket. In some embodiments, at process 345, the system generates metadata associated with the generated data bucket. In certain embodiments, at process 350, the system provides the metadata associated with the generated data bucket to the client application, for example, to grant access to the generated data bucket. In some embodiments, the metadata includes the cryptographic key to allow read access and/or write access to the generated data bucket.

According to certain embodiments, the system is configured to scan the representation of the data bucket in the data repository associated with one or more cloud platforms. In some embodiments, the system is configured to scan the representation of the data bucket stored in the data repository associated with one or more cloud platforms periodically or by one or more trigger events. In certain embodiments, the system determines whether the representation of the data bucket meets one or more criteria. In some embodiments, the one or more criteria include at least one of a criterion on the cryptographic key, a criterion on versioning, a criterion on expiration date, and/or the like. In certain embodiments, in response to determining that the representation of the data bucket does not meet at least one of the one or more criteria, the system may reconfigure the data bucket. In some embodiments, in response to determining the generated data bucket being deleted, the system may re-generate the data bucket.

According to some embodiments, at process 355, the system receives an input associated with the bucket template, the input including an override input or a modification (e.g., a modification of the bucket template). In certain embodiments, at process 360, the system updates the bucket template based at least in part on the input. In some embodiments, the system is configured to generate and/or modify the data bucket using the updated bucket template. In some embodiments, at process 365, the system updates the representation of the data bucket stored in the data repository associated with a respective cloud platform. For example, the system may update the representation of the data bucket in a data repository associated with the first cloud platform and/or update the representation of the data bucket stored in a data repository associated with a second cloud platform different from the first cloud platform.

According to certain embodiments, at process 370, the system receives a deletion request of the data bucket from the client application and disables the cryptographic key. In some embodiments, when the cryptographic key is disabled, the system prevents read access and write access to data in the data bucket. In certain embodiments, in response to receiving the deletion request, the system initiates a deletion grace period. In some embodiments, if a cancel request is received in the deletion grace period from the client application, the system cancels the deletion request. In certain embodiments, if a cancel request is not received in the deletion grace period from the client application, the system deletes the data bucket, for example, empties the data objects and deletes the data bucket. In some embodiments, the system is configured to schedule a deletion of the data bucket.

Figure 5:
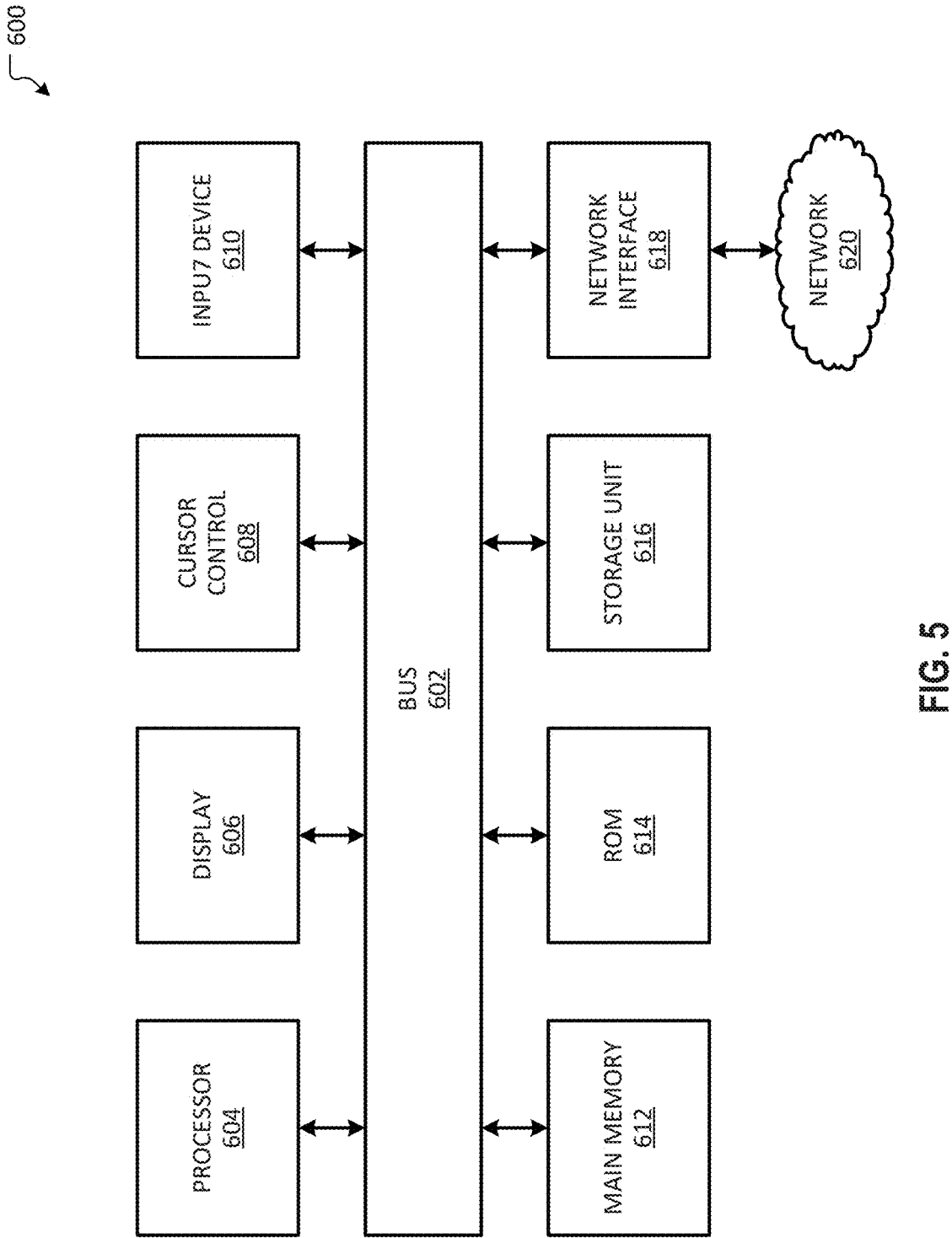
FIG. 5 is a simplified diagram showing a computing system for implementing a system for cloud resource management in accordance with at least one example set forth in the disclosure.

FIG. 5 is a simplified diagram showing a computing system for implementing a system 600 for cloud resource management in accordance with at least one example set forth in the disclosure. This diagram is merely an example, which should not unduly limit the scope of the claims. One of ordinary skill in the art would recognize many variations, alternatives, and modifications.

The computing system 600 includes a bus 602 or other communication mechanism for communicating information, a processor 604, a display 606, a cursor control component 608, an input device 610, a main memory 612, a read only memory (ROM) 614, a storage unit 616, and a network interface 618. In some embodiments, some or all processes (e.g., steps) of the method 300 are performed by the computing system 600. In some examples, the bus 602 is coupled to the processor 604, the display 606, the cursor control component 608, the input device 610, the main memory 612, the read only memory (ROM) 614, the storage unit 616, and/or the network interface 618. In certain examples, the network interface is coupled to a network 620. For example, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For examples, the instructions, when stored in the storage unit 616 accessible to processor 604, render the computing system 600 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control component 608 (e.g., a mouse, a trackball, or cursor direction keys) is configured to communicate additional information and commands (e.g., to control cursor movements on the display 606) to the processor 604.

According to some embodiments, a method for cloud resource management, the method comprising: receiving a request to create a data bucket from a client application, the request including a bucket template; generating a cryptographic key for the data bucket; generating the data bucket in a cloud platform based at least in part on the bucket template; associating the cryptographic key to the generated data bucket; generating metadata associated with the generated data bucket; and providing the metadata associated with the generated data bucket to the client application; wherein the method is performed using one or more processors. For example, the method is implemented according to at least FIG. 1, FIG. 2, and/or FIG. 3.

In certain embodiments, the generating the data bucket comprises: generating a representation of the data bucket based at least in part on the bucket template and the cryptographic key; and storing the representation of the data bucket in a data repository. In some embodiments, the generating the data bucket further comprises: scanning the representation of the data bucket in the data repository; and determining whether the representation of the data bucket meets one or more criteria. In certain embodiments, the generating the data bucket further comprises: in response to determining that the representation of the data bucket does not meet at least one of the one or more criteria, reconfiguring the data bucket. In some embodiments, the generating the data bucket further comprises: in response to determining the generated data bucket being deleted, re-generate the data bucket.

In some embodiments, the operations further comprise: receiving an input associated with the bucket template, the input including an override input or a modification; and updating the bucket template based at least in part on the input; wherein the generating the data bucket comprises generating the data bucket using the updated bucket template. In certain embodiments, the operations further comprise: updating the representation of the data bucket in the data repository. In some embodiments, the cloud platform is a first cloud platform, wherein the data repository is a first data repository in the first cloud platform, wherein the operations further comprise updating the representation of the data bucket in a second data repository in a second cloud platform. In certain embodiments, the request includes a first name of the data bucket: wherein the generating the data bucket comprises designating a second name of the data bucket; wherein the first name of the data bucket is different from the second name of the data bucket.

In some embodiments, the preventing read access and write access to data in the data bucket comprises disabling the cryptographic key. In certain embodiments, the operations further comprise: in response to receiving the deletion request, initiating a deletion grace period; if a cancel request is received in the deletion grace period from the client application, canceling the deletion request; and if a cancel request is not received in the deletion grace period from the client application, deleting the data bucket. In some embodiments, the deleting the data bucket comprises scheduling a deletion of the data bucket. In certain embodiments, the cloud platform is a first cloud platform, wherein the data bucket is a first data bucket, wherein the operations further comprise generating a second data bucket in a second cloud platform based at least in part on the bucket template.

According to some embodiments, a system for cloud resource management, the system comprising: one or more memories comprising instructions stored thereon; and one or more processors configured to execute the instructions and perform operations comprising: receiving a request to create a data bucket from a client application, the request including a bucket template; generating a cryptographic key for the data bucket; generating the data bucket in a cloud platform based at least in part on the bucket template; associating the cryptographic key to the generated data bucket; generating metadata associated with the generated data bucket; and providing the metadata associated with the generated data bucket to the client application. For example, the system is implemented according to at least FIG. 1, FIG. 2, and/or FIG. 3.

In certain embodiments, the generating the data bucket comprises: generating a representation of the data bucket based at least in part on the bucket template and the cryptographic key; and storing the representation of the data bucket in a data repository. In some embodiments, the generating the data bucket further comprises: scanning the representation of the data bucket in the data repository; and determining whether the representation of the data bucket meets one or more criteria. In certain embodiments, the generating the data bucket further comprises: in response to determining that the representation of the data bucket does not meet at least one of the one or more criteria, reconfiguring the data bucket. In some embodiments, the generating the data bucket further comprises: in response to determining the generated data bucket being deleted, re-generate the data bucket.

In some embodiments, the operations further comprise: receiving an input associated with the bucket template, the input including an override input or a modification; and updating the bucket template based at least in part on the input; wherein the generating the data bucket comprises generating the data bucket using the updated bucket template. In certain embodiments, the operations further comprise: updating the representation of the data bucket in the data repository. In some embodiments, the cloud platform is a first cloud platform, wherein the data repository is a first data repository in the first cloud platform, wherein the operations further comprise updating the representation of the data bucket in a second data repository in a second cloud platform. In certain embodiments, the request includes a first name of the data bucket; wherein the generating the data bucket comprises designating a second name of the data bucket; wherein the first name of the data bucket is different from the second name of the data bucket.

In some embodiments, the preventing read access and write access to data in the data bucket comprises disabling the cryptographic key. In certain embodiments, the operations further comprise: in response to receiving the deletion request, initiating a deletion grace period; if a cancel request is received in the deletion grace period from the client application, canceling the deletion request; and if a cancel request is not received in the deletion grace period from the client application, deleting the data bucket. In some embodiments, the deleting the data bucket comprises scheduling a deletion of the data bucket. In certain embodiments, the cloud platform is a first cloud platform, wherein the data bucket is a first data bucket, wherein the operations further comprise generating a second data bucket in a second cloud platform based at least in part on the bucket template.

According to some embodiments, a non-transitory computer-readable storage medium having instructions for cloud resource management that, when executed by one or more processors, cause the one or more processors to perform operations comprising: receiving a request to create a data bucket from a client application, the request including a bucket template; generating a cryptographic key for the data bucket; generating the data bucket in a cloud platform based at least in part on the bucket template; associating the cryptographic key to the generated data bucket; generating metadata associated with the generated data bucket; and providing the metadata associated with the generated data bucket to the client application. For example, the non-transitory computer-readable storage medium is implemented according to at least FIG. 1, FIG. 2, and/or FIG. 3.

In certain embodiments, the generating the data bucket comprises: generating a representation of the data bucket based at least in part on the bucket template and the cryptographic key; and storing the representation of the data bucket in a data repository. In some embodiments, the generating the data bucket further comprises: scanning the representation of the data bucket in the data repository; and determining whether the representation of the data bucket meets one or more criteria. In certain embodiments, the generating the data bucket further comprises: in response to determining that the representation of the data bucket does not meet at least one of the one or more criteria, reconfiguring the data bucket. In some embodiments, the generating the data bucket further comprises: in response to determining the generated data bucket being deleted, re-generate the data bucket.

In some embodiments, the operations further comprise: receiving an input associated with the bucket template, the input including an override input or a modification; and updating the bucket template based at least in part on the input; wherein the generating the data bucket comprises generating the data bucket using the updated bucket template. In certain embodiments, the operations further comprise: updating the representation of the data bucket in the data repository. In some embodiments, the cloud platform is a first cloud platform, wherein the data repository is a first data repository in the first cloud platform, wherein the operations further comprise updating the representation of the data bucket in a second data repository in a second cloud platform. In certain embodiments, the request includes a first name of the data bucket; wherein the generating the data bucket comprises designating a second name of the data bucket; wherein the first name of the data bucket is different from the second name of the data bucket.

In some embodiments, the preventing read access and write access to data in the data bucket comprises disabling the cryptographic key. In certain embodiments, the operations further comprise: in response to receiving the deletion request, initiating a deletion grace period; if a cancel request is received in the deletion grace period from the client application, canceling the deletion request; and if a cancel request is not received in the deletion grace period from the client application, deleting the data bucket. In some embodiments, the deleting the data bucket comprises scheduling a deletion of the data bucket. In certain embodiments, the cloud platform is a first cloud platform, wherein the data bucket is a first data bucket, wherein the operations further comprise generating a second data bucket in a second cloud platform based at least in part on the bucket template.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented, for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method for cloud resource management, the method comprising:
    receiving a request to create a data bucket from a client application, the request including a bucket template;
    generating a cryptographic key for the data bucket;
    generating the data bucket in a cloud platform based at least in part on the bucket template;
    associating the cryptographic key to the generated data bucket;
    generating metadata associated with the generated data bucket; and
    providing the metadata associated with the generated data bucket to the client application;
    wherein the method is performed using one or more processors.

2. The method of claim 1, wherein the generating the data bucket comprises:
    generating a representation of the data bucket based at least in part on the bucket template and the cryptographic key; and
    storing the representation of the data bucket in a data repository.

3. The method of claim 2, wherein the generating the data bucket further comprises:
    scanning the representation of the data bucket in the data repository; and
    determining whether the representation of the data bucket meets one or more criteria.

4. The method of claim 3, wherein the generating the data bucket further comprises:
    in response to determining that the representation of the data bucket does not meet at least one of the one or more criteria, reconfiguring the data bucket.

5. The method of claim 3, wherein the generating the data bucket further comprises:
    in response to determining the generated data bucket being deleted, re-generate the data bucket.

6. The method of claim 2, further comprising:
    receiving an input associated with the bucket template, the input including an override input or a modification; and
    updating the bucket template based at least in part on the input;
    wherein the generating the data bucket comprises generating the data bucket using the updated bucket template.

7. The method of claim 6, further comprising:
    updating the representation of the data bucket in the data repository.

8. The method of claim 6, wherein the cloud platform is a first cloud platform, wherein the data repository is a first data repository in the first cloud platform, wherein the method further comprises updating the representation of the data bucket in a second data repository in a second cloud platform.

9. The method of claim 1, wherein the request includes a first name of the data bucket;

18 wherein the generating the data bucket comprises designating a second name of the data bucket;
    wherein the first name of the data bucket is different from the second name of the data bucket.

10. The method of claim 1, further comprising:
    receiving a deletion request of the data bucket from the client application; and
    preventing read access and write access to data in the data bucket.

11. The method of claim 10, wherein the preventing read access and write access to data in the data bucket comprises disabling the cryptographic key.

12. The method of claim 10, further comprising:
    in response to receiving the deletion request, initiating a deletion grace period;
    if a cancel request is received in the deletion grace period from the client application, canceling the deletion request; and
    if a cancel request is not received in the deletion grace period from the client application, deleting the data bucket.

13. The method of claim 12, wherein the deleting the data bucket comprises scheduling a deletion of the data bucket.

14. The method of claim 1, wherein the cloud platform is a first cloud platform, wherein the data bucket is a first data bucket, wherein the method further comprises generating a second data bucket in a second cloud platform based at least in part on the bucket template.

15. A system for cloud resource management, the system comprising:
    one or more memories comprising instructions stored thereon; and
    one or more processors configured to execute the instructions and perform operations comprising:
        receiving a request to create a data bucket from a client application, the request including a bucket template;
        generating a cryptographic key for the data bucket;
        generating the data bucket in a cloud platform based at least in part on the bucket template;
        associating the cryptographic key to the generated data bucket;
        generating metadata associated with the generated data bucket; and
        providing the metadata associated with the generated data bucket to the client application.

16. The system of claim 15, wherein the generating the data bucket comprises:
    generating a representation of the data bucket based at least in part on the bucket template and the cryptographic key; and
    storing the representation of the data bucket in a data repository.

17. The system of claim 16, wherein the generating the data bucket further comprises:
    scanning the representation of the data bucket in the data repository; and
    determining whether the representation of the data bucket meets one or more criteria.

18. The system of claim 17, wherein the generating the data bucket further comprises:
    in response to determining that the representation of the data bucket does not meet at least one of the one or more criteria, reconfiguring the data bucket.

19. The system of claim 17, wherein the generating the data bucket further comprises:
    in response to determining the generated data bucket being deleted, re-generate the data bucket.

20. A non-transitory computer-readable storage medium having instructions for cloud resource management that, when executed by one or more processors, cause the one or more processors to perform operations comprising:

receiving a request to create a data bucket from a client application, the request including a bucket template;

generating a cryptographic key for the data bucket;

generating the data bucket in a cloud platform based at least in part on the bucket template;

associating the cryptographic key to the generated data bucket;

generating metadata associated with the generated data bucket; and providing the metadata associated with the generated data bucket to the client application.

* * * * *